United States Patent
Beaudry

[15] 3,678,381
[45] July 18, 1972

[54] RADIO FREQUENCY WATTMETER

[72] Inventor: Harvey James Beaudry, Fremont, Calif.

[73] Assignee: International Plasma Corporation

[22] Filed: Aug. 19, 1968

[21] Appl. No.: 753,681

[52] U.S. Cl. ............................................. 324/95, 324/58 B
[51] Int. Cl. .................................. G01r 21/04, G01r 27/04
[58] Field of Search ............. 324/95, 58 B, 58 R, 58.5, 58 A, 324/58 C, 58.5 R, 58.5 A, 58.5 B, 58.5 C; 333/99 PL, 32, 10; 315/248

[56] References Cited

UNITED STATES PATENTS

| | | | |
|---|---|---|---|
| 3,179,884 | 4/1965 | Szajerski | 324/95 |
| 3,197,696 | 7/1965 | Bibo | 324/95 X |
| 3,027,514 | 3/1962 | Bird et al. | 324/95 |
| 1,787,300 | 12/1930 | Alexanderson | 315/248 X |
| 2,486,818 | 11/1949 | Bowman | 333/10 |
| 2,679,632 | 5/1954 | Bellows, Jr. | 333/10 |
| 2,731,585 | 1/1956 | Rousseau | 315/248 |
| 2,913,631 | 11/1959 | Cuker | 315/248 |

OTHER PUBLICATIONS

Terman, F. E.; Radio Engineers Handbook; McGraw-Hill Book Co., Inc.; 1943; pages 1a, 213, 214.

The Radio Amateur's Handbook; American Radio Relay League publication; 1962; pages 1a, 356, 357, 358, 350.

Halverson et al.; Frequency-Shifting Method . . .; Applied Physics Letters; January 15, 1969; pp. 79–81.

Primary Examiner—Rudolph V. Rolinec
Assistant Examiner—Ernest F. Karlsen
Attorney—Warren, Rubin, Brucker & Chickering

[57] ABSTRACT

A wattmeter for measuring the power delivered by a generator operating at a radio frequency, to a load of variable impedance through a coaxial transmission line, wherein the wattmeter is designed for accurate operation when the load is free from capacitive and inductive reactance as evidenced by the wattmeter indicating zero reflected power.

10 Claims, 4 Drawing Figures

PATENTED JUL 18 1972

INVENTOR.
Harvey J. Beaudry
BY
Warren, Rubin, Brucker &
Chickering
Attorneys

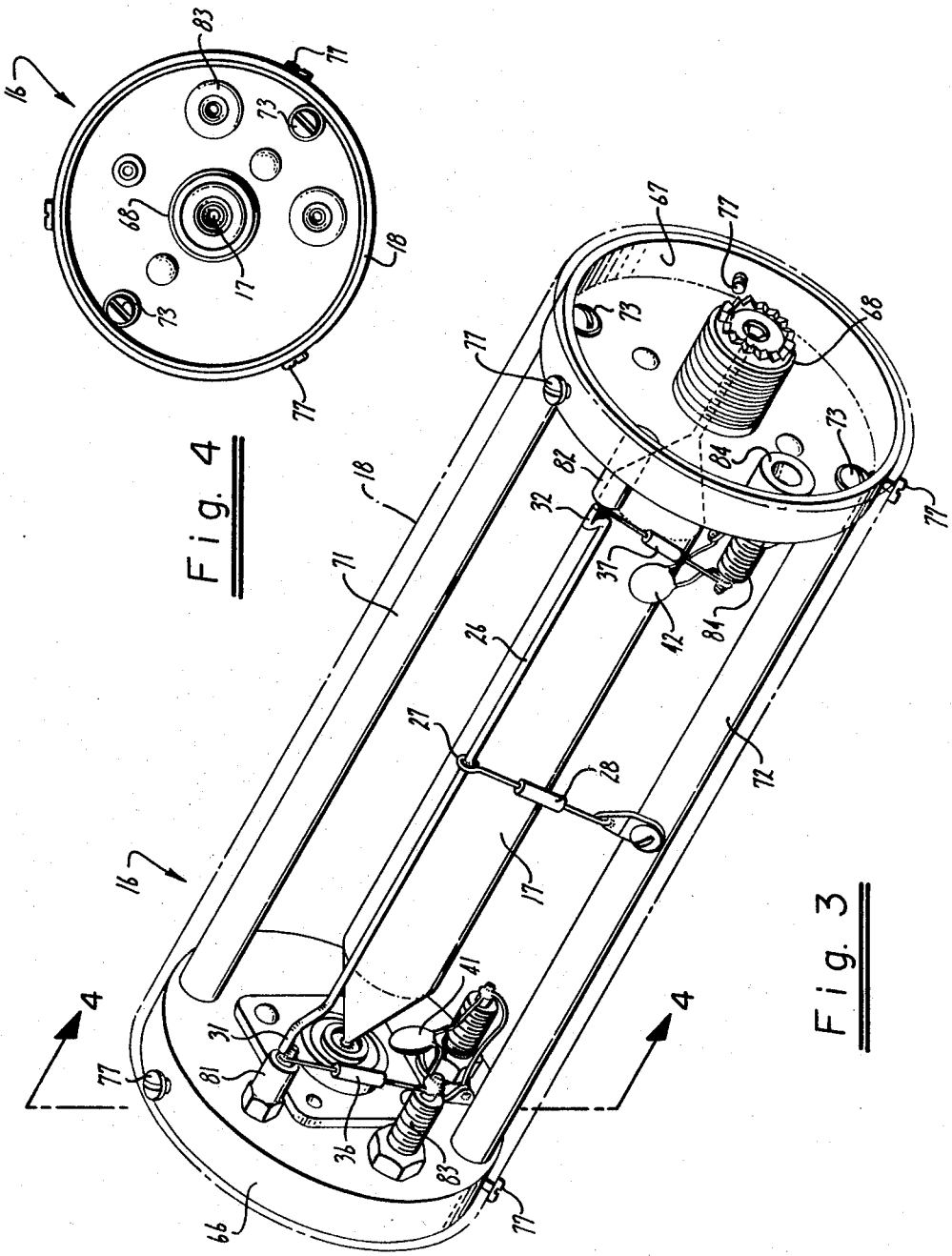

RADIO FREQUENCY WATTMETER

The present invention relates to a wattmeter for measuring R.F. power and more particularly to a wattmeter for use in a system having an R.F. generator which operates at a single frequency and delivers power to a load with variable inductance. These system characteristics are found in electrodeless gas excitation devices (plasma machines) for which the wattmeter of the present invention is most advantageously used.

Wattmeters in general and those designed specifically for measuring power at radio frequencies are characterized by a wide band response within the radio frequency range and thus must of necessity include means for compensating for changes of conditions which accompany changes in frequency. In providing a wattmeter capable of making measurements at any frequency within the radio frequency band, it is necessary to make compromises in other operating characteristics such as the amount of power which they can withstand before being damaged. In addition known meters are relatively insensitive to changes in load impedance characteristics. While these weaknesses in prior art wattmeters are not troublesome in systems for radio signal transmission where the transmitting antenna is a relatively constant load and the amount of reflected power is easily controllable to something below 100 watts, the conditions existing in plasma machines make such prior art devices wholly inadequate. A plasma machine is characterized by a variable load impedance which under normal operating conditions is capable of virtually disappearing so as to impose an open ended condition on the transmission line furnishing power to the reaction chambers of the system. When such an open ended condition is created, it is possible for all of the power in the system to be reflected back toward the source whereby the wattmeter may have to experience reflected power of a magnitude equalling that anticipated for forward transmission, which in the present state of the art is approximately 1,000 watts.

Actually it is somewhat misleading to refer to known wattmeters as "prior art" since in fact such wattmeters are designed for operation under conditions quite distinct from those existing in plasma machines and the wattmeter of the present invention, being designed to meet the conditions of a plasma machine, is not suitable for use where known wattmeters operate quite successfully.

Accordingly, it is an object of the present invention to provide a wattmeter for systems such as plasma machines wherein power at a fixed radio frequency is supplied through a coaxial transmission line to reaction chambers which present a variable load impedance to the transmission line.

It is another object of the present invention to provide a wattmeter for measuring power at a fixed radio frequency which is very sensitive to changes in the reactance components of a load as well as to the total value of load impedance.

Further and more specific objects and advantages of the present invention are made apparent in the following specification wherein a preferred form of the invention is described with reference to the following drawings.

In the drawings:

FIG. 3 is an isometric illustration of the wattmeter of the present invention; and FIG. 4 is an end view of the wattmeter taken along the line 4—4 of FIG. 3.

Figure 1:
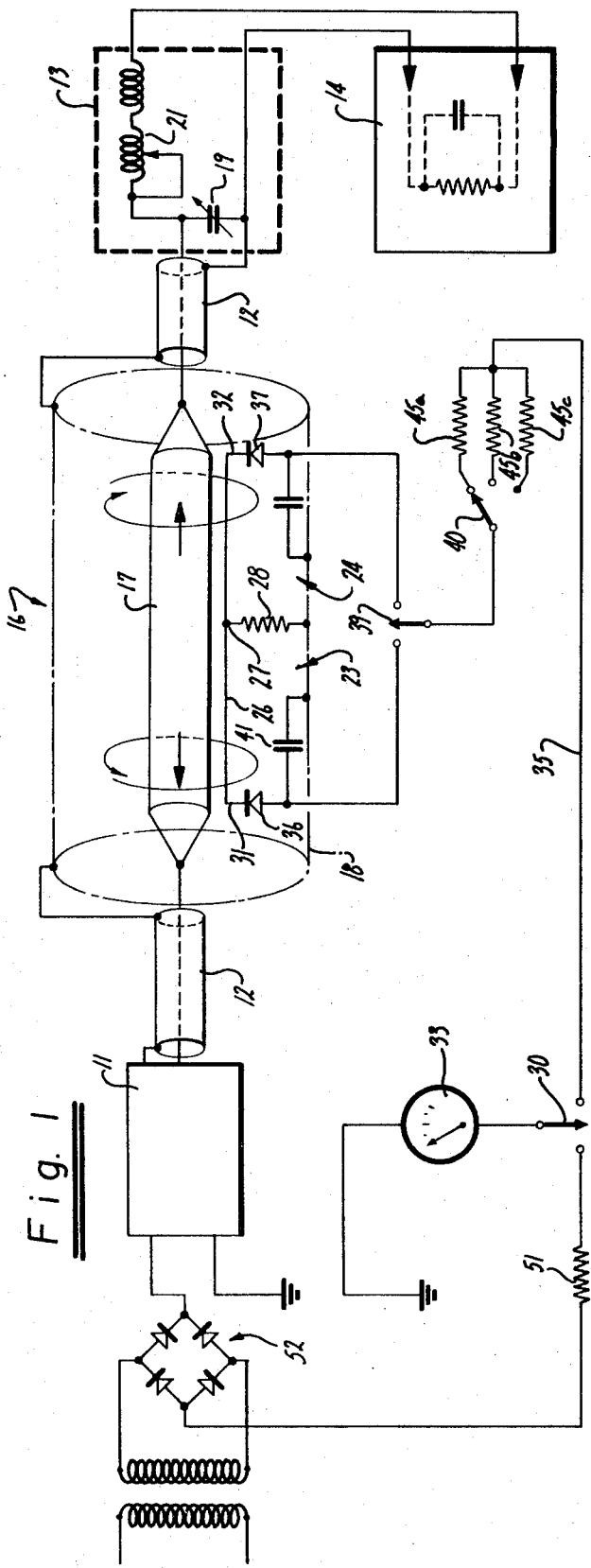
FIG. 1 is an electrical schematic diagram of the invention shown in combination with other components of a plasma machine system.

Electrodeless gas excitation devices, more popularly referred to as plasma machines, operate to provide a relatively low temperature gas plasma. Low temperature gas plasma has found very important uses in several industries, the most well known being the semi-conductor industry wherein low temperature plasmas are used to remove photo resist from silicone wafers during the process of manufacturing solid state components. Plasma machines are also used in other manufacturing processes as well as in connection with diagnostic work wherein samples of materials to be analyzed are placed in a reaction chamber of a plasma machine to enable certain constituents thereof to be ashed from the sample at relatively low temperatures so as to preserve the remaining portions of the sample.

Referring to the drawings, the basic components of a plasma machine are an R.F. generator 11 designed to provide power at a single frequency (13.56 megacycles as assigned by the Federal Communications Commission), a coaxial transmission line 12 which delivers power from the generator to a converter 13 which matches the generator to the load presented by the plasma 14. The generator 11 and transmission line 12 have characteristic impedances which are matched through appropriate circuiting. It is in fact required that the electrical junction between each component be matched, impedance-wise, since the presence of an impedance mismatch gives rise to a certain portion of the power provided by generator 11 being reflected back from the mismatch toward the generator reducing the efficiency of operation of the system. Since it is important to know how much power the generator is delivering at a given instance in order to correctly state the conditions under which an experiment or manufacturing process is being carried out, a wattmeter 16 is disposed in the coaxial transmission line 12 to measure the power being delivered from the generator 11 to the plasma 14 and also to detect the presence, if any, of reflected power in the system. It is also of importance to detect the presence of reactance components in the load and the present invention provides this function better than any known meter, as will be more fully explained below.

Since the generator 11 operates at a given single frequency (13.5 megacycles) the entire system can be designed with the assurance that it will be exposed only to a single frequency and thus expect the ideal situation wherein there are no mismatches of impedances and thus there is zero reflected power in the system.

The plasma 14 is created by subjecting gas at a reduced pressure in a vessel to an electric field at radio frequency which causes the gas to become excited and in some cases ionized. As the gas reacts to the radio frequency power being injected into it, it exhibits impedance characteristics which change as the plasma conditions change (pressure, flow rates, etc.) such that the plasma cannot be treated as a load having a fixed impedance. Thus the system has the inherent capability of producing a mismatch at the input to the load.

In order to eliminate the mismatch between the transmission line 12 and the plasma 14, it is known in the art to dispose a converter 13 between the plasma and the transmission line. The converter 13 is manually adjustable to vary its impedance characteristics so as to combine with the plasma 14 to precisely present to the transmission line 12 an effective impedance which matches that of the transmission line and thereby eliminate the mismatch which would otherwise greatly diminish the efficiency of the generator 11. The wattmeter 16 operates to detect reflected power evidencing a mismatch between the transmission line 12 and converter-plasma load and thereby provides the operator of the machine with the knowledge that the converter must be adjusted to some other setting in order to improve the impedance match between the transmission line and load. Once the converter has been properly adjusted to eliminate all reflected power, the wattmeter is then able to accurately measure the power being delivered from the R.F. generator 11, as will be more fully explained below.

The wattmeter 16 is constructed in the form of a section of transmission line having the identical impedance characteristics as the transmission line 12 so as not to create any disturbance to the balance of the system. Since the wattmeter is provided only to make measurements of the system and not to directly effect the operation of the system, the fact that it has no influence itself on the operation of the system is a highly prized feature lacking in those devices now known in the art.

The transmission line 12 is selected of standard 50 ohm coaxial cable which requires that the characteristic impedance of the wattmeter 16 also be 50 ohms. Since the impedance of a transmission line is a function of the ratio of the diameters of the inner conductors and outer shield, the wattmeter 16 is formed of a section of transmission line of a proper ratio of diameters to give it a characteristic impedance identical with the line in which it is inserted. That is to say the ratio of the diameter of the wattmeter's inner conductor 17 and the outer shield 18 is identical to the ratio of the corresponding components of the transmission line 12 and thus electrically poses no impedance discontinuities in the line. The overall cross-sectional size of the wattmeter is larger than that of line 12 to enable sub-circuits to be disposed herein.

The converter 13, as is known in the art, includes a variable capacitor 19 disposed electrically across the transmission line 12 and a variable inductor 21 disposed in series with the transmission line. The capacitor 19 and inductor 21 are varied during operation of the system to make the proper combination with the resistive and capacitive characteristics of the plasma 14 (as indicated by dotted lines) to produce the desired input impedance to the load which matches the output impedance of the line 12. Since the impedance of transmission line is 50 ohms of pure resistance it is necessary if all reflected power is to be eliminated that the converter 13 combine electrically with the plasma 14 so as to have an input impedance of precisely 50 ohms; which 50 ohms must be purely resistive with both the inductive and capacitive reactance components cancelled out. As is fully described below, the wattmeter 16 is designed and calibrated for the idealized condition of the load being precisely 50 ohms pure resistive impedance such that only when that condition is achieved does the wattmeter accurately measure the power transmitted from the generator to the plasma. Under all other conditions, the wattmeter will indicate the presence of a reflected power and within close approximation give a measurement of the magnitude of that reflected power.

The wattmeter 16 has a pair of circuits 23 and 24 physically disposed between the inner conductor 17 and the shield 18. The circuits 23 and 24 are formed by a second, off-center, transmission line 26 which extends parallel to and along substantially the entire length of the conductor 17 and acts as a detector conductor. The line 26 extends an equal distance on either side of the geometric center of conductor 17 as measured along its longitudinal axis and is effectively open ended at its ends 31 and 32 while being terminated at its precise mid-length 27 by a resistor 28 electrically disposed between conductor 27 and shield 18. While the ends 31 and 32 of detector conductor 26 are electrically open ended they are physically connected to an ammeter 33 through rectifying diodes 36 and 37, respectively, which connect to the conductor 26 at their cathodes and which are electrically joined to a circuit selecting switch 39 at their anodes. The switch 39 enables the ammeter 33 to be selectively electrically joined to either the diode 36 or diode 37 and in that way can be effectively inserted in either circuit 23 or 24 depending on the measurement desired.

The circuit selecting switch 39 is electrically joined to a range switch 40 which is a three-position switch with each position of the switch electrically joined to a separate resistor 45a, 45b and 45c. The value of each resistor is selected to produce a desired current for a known voltage. Each of the resistors is electrically joined by a conductor 35 to one position of an ammeter switch 30 which in turn connects through the selector portion of the switch to the ammeter 33. Thus, switch 39 selects which of circuits 23 and 24 will produce a current measurement while the switch 40 determines the range on which the ammeter 33 is operating and the switch 30 determines whether the ammeter 33 is used for measuring currents in the circuits 23 or 24 or for making a measurement in a different portion of the system as will be described more fully below.

The circuits 23 and 24 share a common resistor 28 which is an important feature of the invention even though theoretically a separate resistor for each circuit would be equivalent. It has been found in practice that by having a common resistor both circuit 23 and 24 are assured of identical conditions since the value of resistor 28 is the same for both circuits and the physical location of resistor 28 is the same for both circuits. The placement of resistor 28 at the precise length of the conductor 26 is essential since it is imperative that the physical characteristics of the two circuits be substantially identical in order to prevent disturbances in the functioning of the wattmeter which do not reflect operating conditions of the system but rather imperfections in the wattmeter itself.

A capacitor 41 is electrically connected between the anode of diode 36 and the shield 18 of the wattmeter to bypass any residual signals which might be passed by the diode 36. A similarly situated capacitor 42 provides the same function with respect to diode 37.

Figure 2:
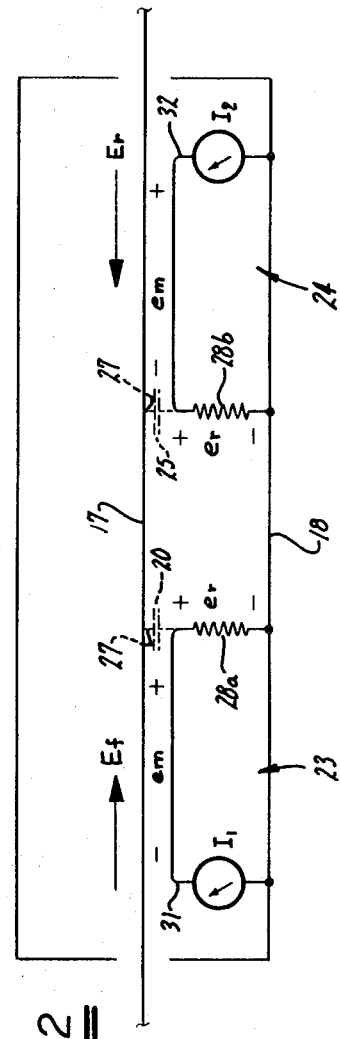
FIG. 2 is an electrical schematic of an electrically equivalent circuit of the wattmeter of the present invention.

Referring to FIG. 2, each of loop circuits 23 and 24 are electro-magnetically coupled to the transmission line formed by shield 18 and central conductor 17 of sensor 16. The circuits 23 and 24 are shown segregated with each having a terminating resistor 28a and 28b. As previously mentioned, resistors 28a and 28b are advantageously combined into a single resistor 28 as shown in FIG. 1. Additionally, the sensor shown in FIG. 2 differs from that of FIG. 1 showing more of a qualitative or functional circuit diagram to facilitate the discussion. In essence, loop circuit 23 is induced with a current flow $I_1$ which is proportional only to the forward portion, $Er$ of the signal flow within meter 12. Loop circuit 24 on the other hand, is induced with a current flow $I_2$ proportional only to the reflected signal flow, $Er$ of the power signal issued by generator 10.

Each loop circuit receives an induced voltage $Em$ as shown which is proportional to the mutual inductive coupling between the loop circuits and meter 12. The induced voltage $Em$ is equal in both instances with the exception that the instantaneous polar orientations thereof cause opposite polarities to occur adjacent resistors 28a and 28b for any given instance. This polarity orientation follows from the geometrical arrangement of loop circuits 23 and 24 relative to conductor 17 and shield 18. In addition to signals $Em$, circuits 23 and 24 receive a voltage $Er$ across resistors 28a and 28b due to a capacitive coupling between the conductors of the loop circuits and central conductor 17. This capacitive coupling is diagrammatically illustrated by capacitors 20 and 25. The capacitively induced voltages $Er$ in each case are equal both in magnitude and polarity as shown. The total current flowing in each of loop circuits 23 and 24 is proportional to the sum of $Em$ and $Er$. As both $Em$ and $Er$ contain components of both the reflective wave and forward traveling wave and due to the opposite polarity orientation of signal $Em$ and the pair of loop circuits, the summation of these signals results in a current flow $I_1$ for loop circuit 23 proportional only to $Ef$, the forward signal, and a current $I_2$ for loop circuit 24 proportional only to $Er$ or the reflected signal flow.

Another way of explaining the operation of meter 16 is in terms of voltage. When a voltage wave is generated from generator 11 through the wattmeter toward the plasma 14, a voltage is induced in the conductor 26 precisely as if a voltage source were disposed between the end 31 of the inner conductor 26 and the shield conductor 18. Since the resistor 28 terminates the section of conductor 26 between ends 31 and central point 27 the presence of an effective generator at end 31 results in current in the conductor 26 between points 31 and central point 27 such that by positioning switch 39 to place ammeter 33 in circuit 23 a current will be indicated.

The forward traveling voltage wave operates to also place an effective generator in circuit 24 but in this case it places it at the midpoint 27 whereby the generator operates into an open ended transmission line and as such produces no current.

Thus the ammeter 33 will indicate that for the forward traveling wave, the circuit 24 does not have a current established therein while the circuit 23 does.

If a mismatch in impedance exists between the load and the transmission line for instance, then a portion of the power generated by the generator 11 will be reflected at the impedance mismatch back toward the generator. This reflected voltage wave will operate to place an effective generator in circuit 24 at the point 32 which looks into a terminated transmission line, namely the termination provided by resistor 28, such that a current will be induced in circuit 24 by the reflected wave and this current can be measured by the ammeter 33. The circuit 23 on the other hand will have an effective generator disposed at the midpoint 27 of conductor 26 due to the reflected wave and since this looks into an open ended transmission line there will be no current in that circuit which ammeter 33 can detect. Thus, for power traveling in the forward direction (from generator 11 toward converter 13) circuit 23 will have current induced to flow therein while circuit 24 will have no such current. Circuit 24 on the other hand is the only one of the two circuits which will have a current induced by a reflected wave.

Since the conductor 26 is in fact operative as a transmission line and is probably best thought of as two separate transmission lines joined at midpoint 27, it is essential that the resistor 28 be selected to terminate the transmission line with a matched impedance. When the resistor 28 is in fact an accurate impedance match with the portion of the conductor 26 between ends 31 and midpoint 27, then the current which is induced in circuit 23 when the system is operating with zero reflected power will be proportional to the power being delivered by the generator 11. Accordingly, it is essential for purposes of accuracy to have the resistor 28 carefully selected to terminate the transmission line 26 in its characteristic impedance.

The value of resistor 28 is best selected by putting a 50 ohm power source at the input of wattmeter 16 and a 50 ohm resistive load at the output and varying the resistance 28 until a meter placed in circuit 23 shows zero current flow. The value of resistance at which there will be a null is unique and thus is the desired value for resistor 28.

Since the physical characteristics of the conductor 26 are, as mentioned above, identical on either side of midpoint 27, the resistor 28 will accurately terminate both halves of the transmission line formed by conductor 26. The value of resistor 28 is dependent on the length of the conductor 26, the position of the conductor relative to conductor 17 and shield 18 as well as the frequency at which the generator 11 operates. As long as the circuits 23 and 24 are not resonant at the frequency at which generator 11 operates, the amount of power which they consume in providing the current for measuring the power transferred by the generator to the plasma will be miniscule and not affect the operation of the system. It is essential, therefore, that the circuits have a resonant frequency other than 13.5 megacycles, in the case of plasma machines, in order to prevent a diversion of power at a magnitude which would destroy the sensor.

The length of detector conductor 26 (approximately 4.5 inches from end 31 to end 32) together with its capacitance relative to center conductor 17 and shield 18 gives it a frequency response which is narrow rather than broad and thus is characterized by a fairly steep frequency response curve. By having a resonant frequency other than the operating frequency of the generator (13.5 megacycles) the meter operates somewhere on its slope such that small changes in frequency produce relatively large movements along the curve. While there are no operating frequency charges which occur, a change in either of the resonant components of the load reactance produces a similar effect. When the load is pure resistance, the wattmeter has no load reactance reflected with its circuit and its frequency response curve is established by its own reactances. When the load exhibits reactance, however, even without a change in overall impedance value, the frequency response curve of the wattmeter shifts due to the load reactance. The shift in the wattmeter frequency response curve is with with respect to a fixed operating frequency (13.5 megacycles) and thus equivalent to a change in frequency relative to a fixed curve. The result is a discernable current in circuit 24 indicating the presence of reactance in the load and thus the need to change the setting of converter 13. Broad band wattmeters are designed to show no response to mere reactance changes i.e. frequency changes and are thus incapable of functioning to provide the needed service which the present invention provides.

In order for the wattmeter to provide measurements of absolute power from the generator to the plasma, it is necessary to calibrate the ammeter 33 and this is done by placing a purely resistive load of 50 ohms at the output of the meter and calibrating the meter as the generator puts out known magnitudes of power. Since the meter is only calibrated for these idealistic conditions, i.e. the output load is a purely resistive 50 ohms, the only conditions under which the meter will accurately provide a measurement of the power which the generator is providing to the plasma is when the converter and plasma combine as a load having precisely 50 ohms of resistive impedance and as mentioned above, this condition is precisely the condition under which the system is perfectly matched and there is no power reflected. It should be mentioned, however, that when the amount of power reflected is small compared to the amount of power which the generator is delivering, the meter indication of the amount of power reflected will be a fairly accurate approximation of the actual amount of power being reflected.

In operation, the system is energized and the switch 39 positioned to place ammeter 33 in circuit 23 so as to indicate the presence and approximate magnitude of reflected power. The converter is adjusted so as to reduce and if possible completely eliminate the reflected power by causing its variable components to assume those values necessary for giving the converter-plasma load an effective impedance of 50 ohms of pure resistance. When ammeter 33 indicates that the reflected power is zero, switch 39 is then positioned to place the ammeter 33 in circuit 24 so as to read the forward power. As previously mentioned, when the forward power is measured under the conditions which produce zero reflected power, the meter accurately relates the actual power being delivered by the generator to the plasma. By noting the power from the generator at which a certain experiment or process is conducted, it becomes possible in the future to re-establish the identical conditions for repeating the experiment or process.

Under all operating conditions of the system, the wattmeter 16 is for all practical purposes completely passive since its impedance characteristics are selected to match the 50 ohm transmission line in which it is inserted. The meter serves not only as a means for measuring the amount of power delivered by the generator but also as an accurate means for detecting the presence of reflected power indicating the need for adjustment of the converter 13.

Since the plasma 14 is subject during operation of the system to be de-energized by means other than a reduction of power from the generator 11 (such as by a loss of vacuum or loss of gas flow through the system, etc.) the wattmeter 16 must be designed to withstand the conditions which will exist when the plasma becomes deenergized while the generator 11 is operating at full power. Under such circumstances, there will be a total reflection of power in the direction of the generator and the peak power experienced by the wattmeter will exceed the rated value of the generator and thus be potentially damaging to the wattmeter. Since the wattmeter of the present invention does not require the broad band characteristics of known wattmeters, the conductor 26 does not have to be disposed in particularly close proximity to the conductor 17 and is thus much better able to withstand high reflected powers than those meters now available in the art. Also unlike many wattmeters, the present invention does not require an element of the detector circuits 23 and 24 to be physically disposed in the actual conductor carrying power to the load. Thus, experiments of unknown results may be carried on without fear that loss of the energization of the plasma while the generator 11 is operating at full power will result in a damaged wattmeter.

Referring now to FIGS. 3 and 4, the wattmeter of the present invention includes a pair of spaced apart end caps 66 and 67 with threaded cable connectors 68 secured at their outer faces (only one of which is shown). The central conductor 17 is of generally cylindrical geometry with its end portions tapered to reduce the diameter of the conductor to be approximately equal to the diameter of the inner conductor of the cable 12 (see FIG. 1) in which the wattmeter is inserted. The end caps 66 and 67 are maintained at a fixed distance from one another by tubular support rods 71 and 72, the opposite ends of which are secured to the end caps as by screws 73. The outer conductor, shield 18, receives the end cap and the assembly therebetween and is physically secured to the end caps as by screws 77. Thus there is electrical continuity between the support rods 71 and 72 and the shield 18 through the end caps 66 and 67 whereby connection of resistor 28 to the support rod 72 produces the desired electrical connection between conductor 26 and shield 18. The conductor 26 is supported between insulated standoffs 81 and 82 secured to end caps 66 and 67, respectively. Diode 36 is electrically connected between standoff 81 and a connector 83 adapted to receive a jack (not shown) or similar connector while diode 37 is similarly connected between standoff 82 and a jack receiving connector 84. The connectors 83 and 84 are accessible from the outer faces of end caps 66 and 67 so that an ammeter can be easily electrically connected into the circuit of the wattmeter.

In addition to measuring rf input power to plasma 14, meter 26 is adapted to register a separate wattage measurement, particularly the wattage input to the power tube of generator 11. The measurement of the input power to generator 10 is desirable in order to compare the input power and the power finally received by plasma 14 as a measure of efficiency. A substantial difference between these two wattage ratings indicates that something is burning up, possibly the rf generator. In order to provide this measurement, switch 30 connects meter 33 through a precision voltage drop power resistor 51 in series with the power supply 52 of generator 11. As the current flow for a given power level through resistor 37 may be calibrated in proportion to the wattage or power issued to generator 11, meter 33 may be provided with a scale for registering such power. This results in four scales for meter 26, three for three ranges of rf power provided by resistors 45a, 45b and 45c and one range for dc power supplied to generator 10.

What is claimed is:

1. A wattmeter for measuring the power transmitted by a generator operating at a single frequency in the radio frequency spectrum to a load having a variable impedance, including an impedance which precisely matches the characteristic impedance of a coaxial transmission line connecting the generator to the load, and for detecting power reflected toward the generator, comprising in combination:

an enlarged section of coaxial transmission line formed by an inner conductor and an outer shield wherein the ratio of the diameters of said inner conductor and shield is proportional to the ratio of the conductors forming the coaxial transmission line which joins the generator to the load whereby the enlarged section of transmission line has the same impedance characteristic as the transmission line and wherein said enlarged section of transmission line is disposed in the transmission line which joins the generator to the load whereby power delivered from the generator to the load passes through the enlarged portion of transmission line and further whereby reflected power from the load toward the generator also passes through the enlarged section of transmission line;

a detector conductor fixedly disposed between said inner conductor and said shield and extending generally parallel to the longitudinal axis of said enlarged section of transmission line;

resistor means electrically disposed between said detector conductor and said shield wherein said resistor means is electrically connected to said detector conductor at a point midway between the ends thereof and to said shield; and current measuring means operatively associated with said detector conductor at the end portions thereof whereby the current if any, induced in said detector conductor is detectable and measurable.

2. The wattmeter of claim 1 wherein said detector conductor is further described as extending an equal distance on either side of the mid-point of said enlarged section of transmission line as measured along its longitudinal axis and wherein said resistor means is joined to said detector conductor at its mid-point as measured along its longitudinal axis, whereby two substantially identical open ended circuits are formed by said detector conductor and said resistor means.

3. The wattmeter of claim 2 wherein said resistor means is further described as comprising a resistor having an impedance value precisely equal to the characteristic impedance of the portion of detector conductor between the mid-point thereof and one end thereof as measured when the generator is delivering power at its characteristic frequency into a load the impedance of which precisely matches the characteristic impedance of the transmission line connecting the generator to the load.

4. A wattmeter comprising in combination:

a section of coaxial transmission line formed by an inner conductor having an enlarged section and a spaced apart coaxially disposed outer conductor;

a single continuous detector conductor disposed between the enlarged section of said inner conductor and the outer conductor of the transmission line and extending generally parallel to the longitudinal axis thereof;

a resistor positioned in the space between the inner and outer conductors and electrically joined at one of its ends at a point approximately half way between the ends of said detector conductor and at its other end to the outer conductor of said transmission line, said resistor having an impedance value which is a function of the characteristic impedance of said detector conductor; and current measuring means operatively associated with said detector conductor at the end portions thereof whereby the current, if any, induced in said detector conductor is detectable and measurable.

5. The wattmeter of claim 4 wherein said detector conductor extends over substantially the entire length of said transmission line and equally on either side of the mid-length thereof and wherein said resistor is joined to said detector conductor at a mid-length thereof whereby substantially identical open ended circuits are formed by said detector conductor and said resistor.

6. A system for measuring power in a plasma machine wherein an R. F. generator having a single operating frequency delivers power at or below a rated output power level via a coaxial transmission line to a load comprised of a convertor and plasma in reaction chambers, the convertor having variable inductance and capacitance components which when properly adjusted combine with the capacitive and resistive characteristics of the plasma to form a purely resistive impedance of a magnitude precisely equal to the characteristic impedance of the coaxial transmission line, said system comprising in combination: a wattmeter having a section of coaxial transmission line formed by an inner conductor having an enlarged section and a spaced apart coaxially disposed outer conductor;

a single continuous detector disposed between the enlarged section of said inner conductor and the outer conductor of the transmission line and extending generally parallel to the longitudinal axis thereof;

a resistor positioned in the space between the inner and outer conductors and electrically joined at one of its ends at a point approximately half way between the ends of said detector conductor and at its other end to the outer conductor of said transmission line, said resistor having an impedance value which is a function of the characteristic impedance of said detector conductor; and current measuring means operatively associated with said detector conductor at the end portions thereof; and said wattmeter operatively associated with said transmission line and responsive to the flow of power therethrough to have a current induced therein wherein the current which flows in the inner conductor is proportional to the power which is flowing through the transmission line when the converter is adjusted to combine with the plasma to form a purely resistive impedance, and the current, if any, induced in said detection conductor is detectable and measurable.

7. The system of claim 6 further comprising a resistor electrically connected to said detector conductor between its ends and to said coaxial transmission line to form a pair of electrically identical circuits with said conductor wherein the impedance value of said resistor is precisely that impedance required to terminate the detector conductor between each end and the location at which the resistor is attached to the conductor in a matched load under the operating conditions of the generator providing power at its operating frequency and the convertor adjusted to present a purely resistive load to the transmission line.

8. The system of claim 7 wherein said detector conductor is sufficiently long to give it a relatively narrow frequency response and said current measuring means is operatively disposed with respect to said detector conductor to enable it to measure the current in either of the circuits formed by said conductor and said resistor wherein current in one circuit is an indication of forward power from the generator to the load and current in the other circuit is an indication of power reflected from the load to the generator.

9. The system of claim 8 wherein the resonant frequency of the circuits formed by said detector conductor and said resistor is different than the operating frequency of the conductor.

10. The system of claim 6 wherein the generator receives D.C. power at its input and wherein said system further comprises;

switch means between said current measuring means and said detector conductor;

a precision resistor electrically connected between the input to the generator and said switch means whereby said current measuring means may be selectively deployed to measure the power into the generator or the power through the transmission line.

* * * * *

UNITED STATES PATENT OFFICE
CERTIFICATE OF CORRECTION

Patent No. 3,678,381          Dated July 18, 1972

Inventor(s)  HARVEY JAMES BEAUDRY

It is certified that error appears in the above-identified patent and that said Letters Patent are hereby corrected as shown below:

Column 7, line 37, "generator 10" is corrected to read --generator 11--.

Column 7, line 50, "generator 10" is corrected to read --generator 11--.

Signed and sealed this 13th day of August 1974.

(SEAL)
Attest:

McCOY M. GIBSON, JR.
Attesting Officer

C. MARSHALL DANN
Commissioner of Patents